(12) United States Patent
Edel

(10) Patent No.: US 8,340,938 B2
(45) Date of Patent: Dec. 25, 2012

(54) COMPUTER SYSTEM FOR EVALUATING SAFETY CRITICAL SENSOR VARIABLES

(75) Inventor: Jan Edel, Ludenscheid (DE)

(73) Assignee: Leopold Kostal GmbH & Co. KG, Luedenscheid (DE)

( * ) Notice: Subject to any disclaimer, the term of this patent is extended or adjusted under 35 U.S.C. 154(b) by 422 days.

(21) Appl. No.: 12/785,821

(22) Filed: May 24, 2010

(65) Prior Publication Data

US 2010/0241390 A1 Sep. 23, 2010

Related U.S. Application Data

(63) Continuation-in-part of application No. PCT/EP2009/050164, filed on Jan. 8, 2009.

(30) Foreign Application Priority Data

Jan. 8, 2008 (DE) .................. 10 2008 003 515

(51) Int. Cl.
G06F 11/30 (2006.01)
G06F 19/00 (2011.01)

(52) U.S. Cl. . 702/117; 73/865.8; 73/865.9; 324/762.06; 702/182; 702/183; 702/189; 714/1; 714/25; 714/37

(58) Field of Classification Search .......... 73/865.8, 73/865.9; 324/500, 537, 762.01, 762.02, 324/762.06; 702/1, 33, 34, 108, 117, 118, 702/127, 182, 183, 187, 189; 714/1, 25, 714/37, 100
See application file for complete search history.

(56) References Cited

U.S. PATENT DOCUMENTS 3,082,374 A * 3/1963 Buuck .................. 324/73.1
3,219,927 A * 11/1965 Topp, Jr. et al. ........... 714/735
(Continued)

FOREIGN PATENT DOCUMENTS

DE 3600092 A1 7/1986
(Continued)

OTHER PUBLICATIONS

Wikipedia, IEC 61508, en.wikipedia.org/wiki/IEC_61508, Oct. 7, 2012.

(Continued)

*Primary Examiner* — Edward Cosimano
(74) *Attorney, Agent, or Firm* — Brooks Kushman P.C.

(57) ABSTRACT

A computer system for safety critical sensor variables includes first and second sensors which respectively output first and second sensor variables, a computer, and an independent comparator. The computer calculates an output variable from the first sensor variable by a first function. The computer calculates a comparison variable from the output variable by a second function. The comparison variable and the second sensor variable are applied to the input of the comparator. The second sensor variable is not an input variable of the computer and differs from the first sensor variable in terms of its qualitative value. By calculations of the computer and, if appropriate, of the comparator, an expected comparison variable for the second sensor variable is determined from the calculated output variable, and the correspondence of the two variables is checked by the comparator. Specific internal errors of the computer can thereby be discovered.

8 Claims, 3 Drawing Sheets

U.S. PATENT DOCUMENTS

| | | | | |
|---|---|---|---|---|
| 3,237,100 A | * | 2/1966 | Chalfin et al. | 324/108 |
| 3,321,613 A | * | 5/1967 | Searle | 702/182 |
| 3,492,572 A | * | 1/1970 | Jones et al. | 714/740 |
| 3,546,582 A | * | 12/1970 | Barnard et al. | 714/724 |
| 4,734,687 A | | 3/1988 | Jones | |
| 6,856,158 B2 | * | 2/2005 | Frame et al. | 324/762.01 |
| 7,612,464 B2 | * | 11/2009 | Yano | 307/10.1 |
| 8,209,039 B2 | * | 6/2012 | Davis et al. | 700/30 |
| 2003/0208711 A1 | * | 11/2003 | Frame et al. | 714/742 |
| 2006/0293831 A1 | * | 12/2006 | Yano | 701/114 |
| 2010/0082122 A1 | * | 4/2010 | Davis et al. | 700/30 |

FOREIGN PATENT DOCUMENTS

| | | |
|---|---|---|
| DE | 4219457 A1 | 12/1993 |
| DE | 10318171 A1 | 11/2004 |

OTHER PUBLICATIONS

The International Bureau of WIPO, The International Preliminary Report on Patentability, for corresponding PCT/EP2009/050164, mailed Aug. 19, 2010.

* cited by examiner

COMPUTER SYSTEM FOR EVALUATING SAFETY CRITICAL SENSOR VARIABLES

CROSS-REFERENCE TO RELATED APPLICATIONS

This application is a continuation-in-part of International Application No. PCT/EP2009/050164, published in German, with an international filing date of Jan. 8, 2009, which claims priority to DE 10 2008 003 515.7, filed Jan. 8, 2008; the disclosures of which are both hereby incorporated by reference.

TECHNICAL FIELD

The present invention relates to a computer system for evaluating safety critical sensor variables.

BACKGROUND

One example of a basic functional safety standard is IEC 61508, published by the International Electrotechnical Commission (IEC) and entitled "Functional safety of electrical/electronic/programmable electronic (E/E/PE) safety-related systems." IEC 61508 is an international standard of rules for the creation of such systems that carry out safety functions. IEC 61508 prescribes specific hardware-technical minimum values, e.g., for FIT (failure in time) and SFF (safe failure fraction), for safety integration level 3, which can generally only be attained by additional software-technical measures. In particular, verification of protection against computer failure of the CPU accounts for a significant part of the overall verification of safety integrity.

Typically, two different micro-controller chips, or at least two parallel computational paths on one micro-controller chip, have been used. Inverted computational paths, described for example in the DE 42 19 457 A1, have also been used occasionally. The two-chip solution is expensive in mass production. In the parallel computational paths on a single chip solution, the functional safety can only be limited, or can only be verified with additional hardware, because the CPU computes incorrectly in the same manner in the case of internal errors in the parallel or inverted computational paths. CPU errors can thus remain undiscovered under certain circumstances. Direct verification is absent that the CPU has not made the same error in both computational directions resulting in two identical but false results being obtained in the comparison of the results, or that in the case of inverted computational paths the CPU erroneously ignores both computational directions, for example, and directly compares two input variables.

SUMMARY

An object of the present invention is a computer system for evaluating safety critical sensor variables which demonstrably achieves a relatively high safety integrity level for the CPU without relying on a separate intricate CPU test.

In carrying out the above object and other objects, the present invention provides a system for evaluating safety critical sensor variables. The system includes a computer, a comparator independent of the computer, a first sensor that outputs a first sensor variable $e_1$ to the computer, and a second sensor that outputs a second sensor variable $e_2$ directly to the comparator such that the second sensor variable $e_2$ bypasses the computer. The computer calculates an output variable A based on the first sensor variable $e_1$ and a first function f1 according to the equation $A=f1(e_1)$. The computer calculates a reference variable v based on the output variable A and a second function f2 according to the equation $v=f2(A)$ and the computer outputs the reference variable v to the comparator. The first and second sensor variables $e_1$, $e_2$ are in a relationship involving a third function g according to the equation $e_2=g(e_1)$. The third function g is not the identity function. The second function f2 is given by a concatenation of the third function g with the inverted first function $\overline{f1}$ according to the equation $f2=g\circ\overline{f1}$. The comparator compares the reference variable v with the second sensor variable $e_2$ to determine whether the equation $v=e_2$ is correct. The comparator determining the equation $v=e_2$ to be correct is indicative of the computer properly calculating the reference variable v based on the output variable A and the second function f2 according to the equation $v=f2(A)$.

Further, in carrying out the above object and other objects, the present invention provides another system for evaluating safety critical sensor variables. This system includes a computer, a comparator independent of the computer, a first sensor that outputs a first sensor variable $e_1$ to the computer, and a second sensor that outputs a second sensor variable $e_2$ directly to the comparator such that the second sensor variable $e_2$ bypasses the computer. The computer calculates an output variable A based on the first sensor variable $e_1$ and a first function f1 according to the equation $A=f1(e_1)$. The computer calculates a first reference variable $v_1$ based on the output variable A and a second function f2 according to the equation $v_1=f2(A)$ and the computer outputs the first reference variable $v_1$ to the comparator. The first and second sensor variables $e_1$, $e_2$ are in a relationship involving a third function g and a fourth function h concatenated with one another according to the equation $e_2=(h\cdot g)(e_1)$. Neither the third function g nor the fourth function h is the identity function. The second function f2 is given by a concatenation of the third function g with the inverted first function $\overline{f1}$ according to the equation $f2=g\circ\overline{f1}$. The comparator calculates a second reference variable $v_2$ based on the first reference variable $v_1$ and the fourth function h according to the equation $v_2=h(v_1)$. The comparator compares the second reference variable $v_2$ with the second sensor variable $e_2$ to determine whether the equation $v_2=e_2$ is correct. The comparator determining the equation $v_2=e_2$ to be correct is indicative of the computer properly calculating the first reference variable $v_1$ based on the output variable A and the second function f2 according to the equation $v_1=f2(A)$.

A computer system in accordance with embodiments of the present invention includes a micro-computer or micro-controller ("computer" or "CPU"). At least two sensors and a comparator external to the computer are also incorporated in the computer system. The first and second sensors qualitatively or at least quantitatively respectively supply first and second sensor variables for a system state to be measured. It is assumed that a known functional relationship exists between the first and second sensor variables of the sensors.

The first sensor variable from the first sensor is applied to an input of the computer. The computer computes an output variable based on the first sensor variable. The computer makes the output variable available for practical useful purposes such as a control variable for an actuator.

The computer further computes a reference variable based on the output variable. The reference variable corresponds to the anticipated second sensor variable from the second sensor. The computer provides the reference variable to the comparator. The comparator checks the reference variable for agreement with the actual second sensor variable from the second sensor. The second sensor variable from the second sensor is completely unknown to the computer. A positive comparison thus testifies to the safety integrity of the computer and assures that a calculation of the output variable and the reference variable was carried out properly. At the same time, the verification based on the prior art regarding the correct functioning of the sensors involved is still preserved, being obtained in principle from a comparator.

A concept on which the computer system in accordance with embodiments of the present invention is based is to use various sensors qualitatively or only quantitatively that yield the various measured values, or at least different values, and for this reason are always on the alert for different data levels at all times during the processing, and are indeed independent of the algorithm used (parallel/inverted/inverse/complementary/back-calculated).

At no time is the computer in a position to provide the reference variable in any other manner (e.g., by making a copy of the first sensor variable) than by the result of a correctly executed calculation. Checking the reference variable and the second sensor variable is now decisive in verifying the safety integrity of the computer. The reference variable and the value of an additional, independent data source previously unknown to the computer are compared (possibly in a tolerance band compensating for possible deviations, such as, for example, imprecision of the sensor). This value is given by the second sensor variable.

Because the second sensor variable consists of raw data, and thus does not come into contact with the computer, and is absolutely unprocessed, the comparison produces a result at this point that depends only on the integrity of the computer. An absence of errors is assumed here for the two sensors, and their own CPUs, which can only be assured and verified by independent means.

The above features, and other features and advantages of the present invention are readily apparent from the following detailed descriptions thereof when taken in connection with the accompanying drawings.

DETAILED DESCRIPTION

Figure 3:
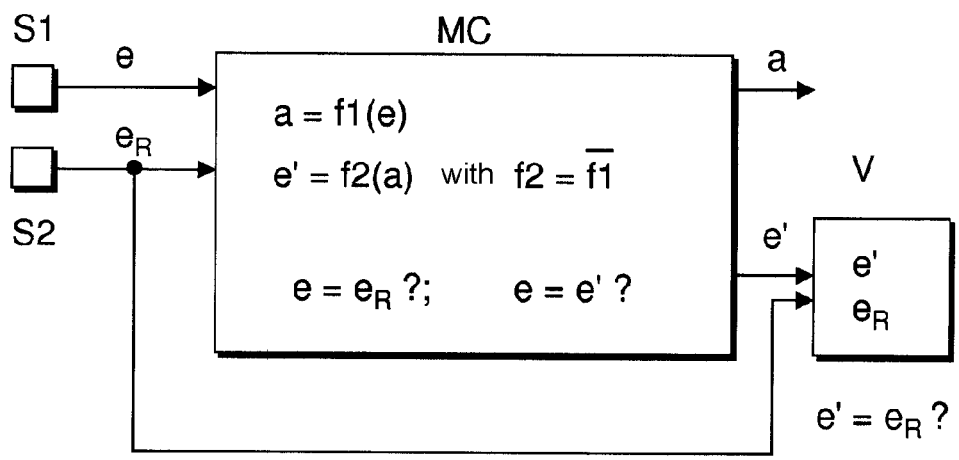
FIG. 3 illustrates a prior art computer system.

Referring initially to FIG. 3, a prior art computer system is shown. This computer system is a simplified representation of the computer system described in DE 42 19 457 A1. Only the components for describing problems lending to the present invention are shown. This computer system includes a computational chip component such as a micro-computer or a micro-controller ("computer MC" or "CPU") and first and second sensors S1, S2. Computer MC receives first and second sensor variables e, $e_R$ respectively supplied by sensors S1, S2. Sensor variables e, $e_R$ are assumed to be digital values. However, sensors S1, S2 could supply analog signals that are digitized inside computer MC.

Computer MC calculates an output variable a (or an output variable A) using a first function f1 on first sensor variable e (i.e., a=f1(e)). Computer MC outputs output variable a at a first output to an actuator or the like for controlling the actuator. Computer MC also calculates a reference variable e' using a second function f2 on output variable a (i.e., e'=f2(a)). As described in DE 42 19 457 A1, second function f2 is first function f1 inverted with respect to first sensor variable e of first function f1 (i.e., f2=$\overline{f1}$). Reference variable e' agrees with first sensor variable e if computer MC is operating correctly. This can be tested internally in computer MC by determining whether first sensor variable e and reference variable e' agree (i.e., e=e'?).

Further, first sensor variable e, which is from first sensor S1, and a second sensor variable $e_R$ from second sensor S2 can also be tested for agreement (i.e., e=$e_R$?) where sensors S1, S2 are redundant and thereby supply quantitatively similar sensor variables e, $e_R$.

Computer MC can deliver false comparisons when functioning incorrectly. Accordingly, the computer system of FIG. 3 further includes an external comparator V. Comparator V compares second sensor variable $e_R$ from second sensor S2 with calculated reference variable e' (i.e., e'=$e_R$?). Due to the specified identities (e=$e_R$ and e=e'), this comparison also confirms the identity of the compared variables e', $e_R$ for properly functioning sensors S1, S2 and an error-free computer MC.

A problem with the computer system of FIG. 3 is that specific errors of the computer system can remain concealed. As shown schematically in FIG. 4, the problem results when first sensor variable e arrives at the output of computer MC as the would-be calculated reference variable e' without a computation having been carried out. This can occur, for example, by first sensor variable e being read into a register of computer MC and later being read from this register as the would-be computed reference variable e' and passed on to the output of computer MC without computations having taken place using first and second functions f1, f2.

As first and second sensor variables e, $e_R$ are provided as being identical on the input side of computer MC, a comparison of calculated reference variable e' and second sensor variable $e_R$ performed by comparator V thus also produces an agreement. Comparator V is thus not capable of detecting the described computing error.

Another error scenario involves computer MC making an error both in the calculation of first function f1 and in the computation of second function f2, and that these errors cancel one another. This is another situation where neither internal nor external computer comparisons can detect the error. A systematic sign error is an example of this, in which two erroneous computational steps again cancel one another. In this case, output variable a calculated during the first computational step is still in error, which can have safety-critical consequences.

Figure 1:
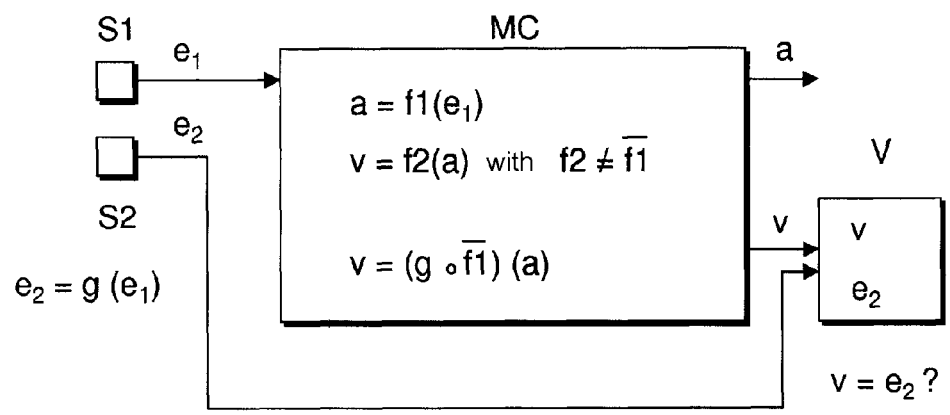
FIG. 1 illustrates a computer system in accordance with an embodiment of the present invention.
Figure 4:
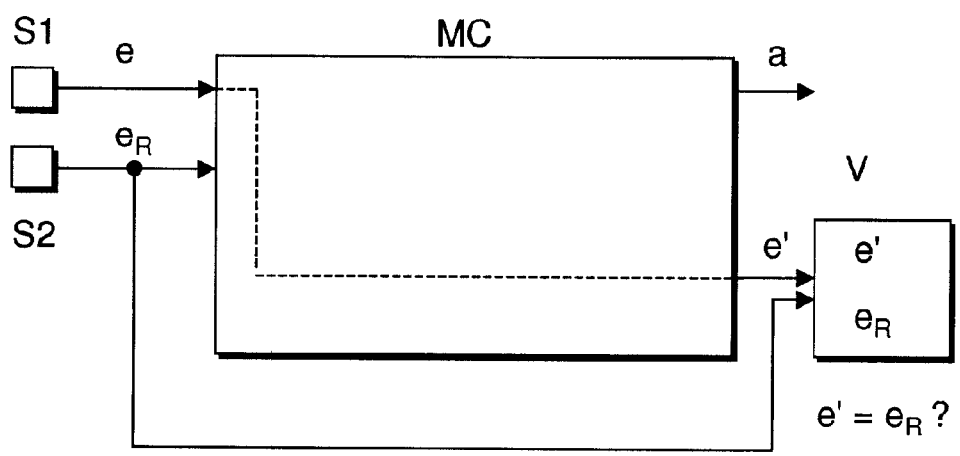
FIG. 4 further illustrates the prior art computer system of FIG. 3.

Referring now to FIG. 1, a computer system in accordance with an embodiment of the present invention is shown. This computer system excludes the possibilities for error of the prior art computer system noted above. Certain notations from FIGS. 3 and 4 are used to describe the computer system of FIG. 1 in order to clarify similarities and differences with respect to the prior art computing system.

The computer system shown in FIG. 1 includes a computer MC, first and second sensors S1, S2, and a comparator V. Sensors S1, S2 respectively supply to computer MC redundant first and second sensor variables $e_1$, $e_2$, i.e., independent signals that contain similar information content with respect to the system state to be measured, but whose signal values are not at all identical. Sensor variables $e_1$, $e_2$ from sensors S1, S2 have a known functional relationship given by a function g (i.e., $e_2$=g($e_1$)). Function g can be arbitrary, but may not be the identity function, since this would lead to the problems described above with reference to FIGS. 3 and 4. Further, second sensor variable $e_2$ is only provided for an external comparison and is thus not passed to computer MC.

Another requirement is that second function f2 for computing a reference variable v does not result in first function f1 by way of the inverse function (i.e. $f2 \neq \overline{f1}$), but takes into consideration the functional relationship g between first and second sensor variables $e_1$, $e_2$. Second function f2 advantageously results from a concatenation of the function f1, inverse of f1, with function g: $v=f2(a)=(g \cdot \overline{f1})(a)$.

When the computation is carried out correctly, reference variable v present at the output of computer MC agrees with second sensor variable e, (i.e., $v=e_2$), which is checked by comparator V ($v=e_2$?).

The previously described error scenarios are excluded here, as second sensor variable $e_2$ is never present as the input value at any point in the computation, and can only be the result of a correct computation.

Functional relationship g between first and second sensor variables $e_1$, $e_2$ of first and second sensors S1, S2 can be expressed in the simplest case by an additive constant K: $e_2=e_1+K$.

It is thus possible that when sensors S1, S2 are angle sensors, second sensor S2 has a constant angular displacement with respect to first sensor S1.

Alternatively, it can be provided that second sensor variable $e_2$ is a multiple k of first sensor variable $e_1$: $e_2=ke_1$.

A far more complex relationship can exist between first and second sensor variables $e_1$, $e_2$. In particular, two sensors can also be provided that determine the sensor variables according to different physical measurement principles, so that a more or less complex relationship is given between first and second sensor variables $e_1$, $e_2$ from the outset. As such, in an embodiment, first and second sensors detect different physical variables.

Figure 5:
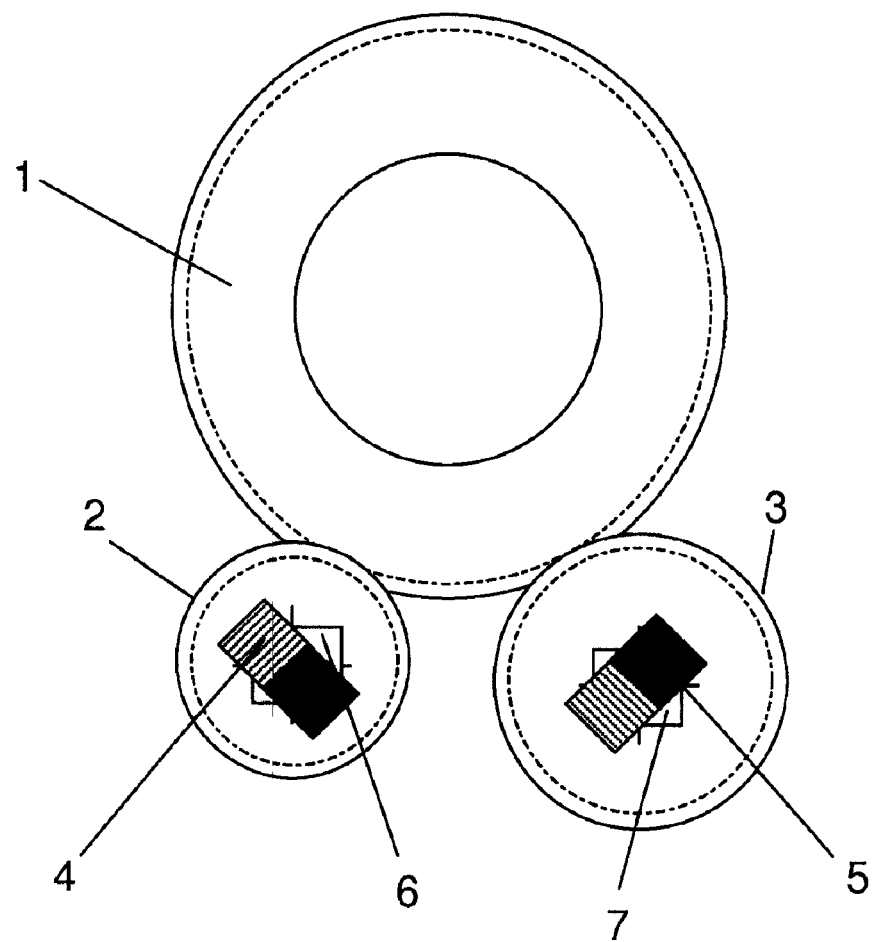
FIG. 5 illustrates an example of an application of a computer system in accordance with an embodiment of the present invention.

A sensor system for detecting an angle of rotation is illustrated in FIG. 5 in which the computer system of FIG. 1 can advantageously be used. A drive wheel 1 whose angle of rotation is to be determined drives first and second measurement wheels 2, 3 having different radii. Magnets 4, 5 are respectively connected to measurement wheels 2, 3. Stationary Hall sensors 6, 7 are respectively associated with measurement wheels 2, 3. Magnet 4 rotates with first measurement wheel 2 with respect to Hall sensor 6. Similarly, magnet 5 rotates with second measurement wheel 3 with respect to Hall sensor 7. The rotational angles detected by Hall sensors 6, 7 thereby differ by a constant factor which yields the angle of drive wheel 1 from the different transmission ratios of measurement wheels 2, 3.

Figure 2:
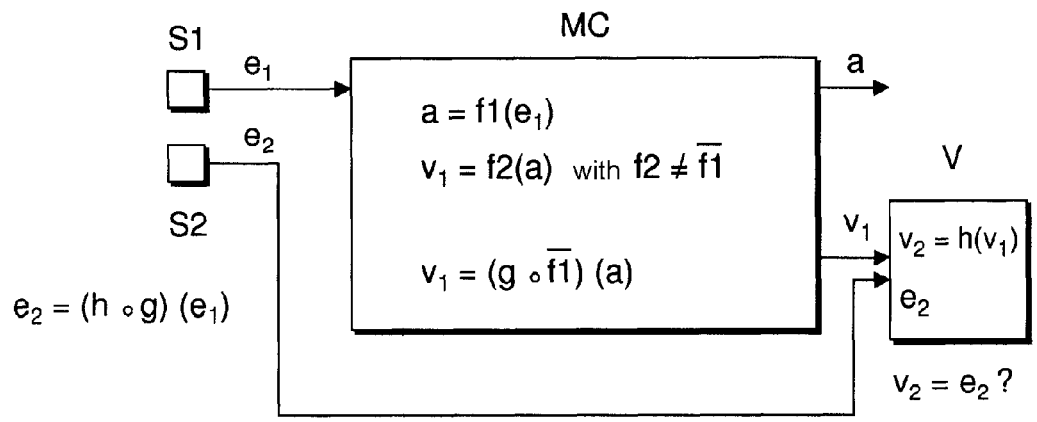
FIG. 2 illustrates a computer system in accordance with another embodiment of the present invention.

Referring now to FIG. 2, a computer system in accordance with another embodiment of the present invention is shown. The computer system shown in FIG. 2 represents an advantageous improvement of the computer system shown in FIG. 1. In the computer system shown in FIG. 1, the safety integrity of the actual comparator V at the end of the sequence of processes is postulated as given, and the normalized proof of this must be provided separately.

It is assumed that the functional relationship between first and second sensor variables $e_1$, $e_2$ can be represented by a concatenation of two functions h and g, so that the result is: $e_2=(h \circ g)(e_1)$.

The computation described with the aid of FIG. 1 has already been carried out in computer MC which leads to first reference variable $v_1$: $v_1=f2(a)=(g \cdot \overline{f1})(a)$, where $f2 \neq \overline{f1}$.

However, because the functional relationship between first and second sensor variables $e_1$, $e_2$ is no longer given by function g, but by the concatenation (h·g), first reference variable $v_1$ that reaches comparator V is not suitable for being compared to second sensor variable $e_2$.

From there, comparator V calculates second reference variable $v_2$ from first reference variable $v_1$ using the function h by the relationship: $v_2=h(v_1)$.

Second reference variable $v_2$ agrees with second sensor variable $e_2$ (i.e., $v_2=e_2$) when computer MC and comparator V are functioning properly due to the following relationships:

$$\begin{aligned}
v_2 &= h(v_1) \\
&= h \circ (g \circ \overline{f1})(a) \\
&= (h \circ g) \circ \overline{f1}(a) \\
&= (h \circ g)(e_1) \\
&= e_2
\end{aligned}$$

It can thus be concluded from a positive comparison result that both computer MC and comparator V are carrying out accurate computations. These embodiments thereby enable a simultaneous functional test of both computer MC and the computational path of comparator V.

REFERENCE SYMBOLS

MC computer (micro-controller)
S1, S2 first and second sensors
V comparator
a (or A) output variable
e, $e_R$, $e_1$, $e_2$ sensor variables
e' reference variable
f1, f2 first and second functions
g third function
h fourth function
$\overline{f1}$ inverse function (inverse of function f1)
v reference variable
$v_1$, $v_2$ first and second reference variables
K additive constant
k constant factor
1 drive wheel
2, 3 first and second measurement wheels
4, 5 first and second magnets
6, 7 first and second Hall sensors As required, detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A system for evaluating safety critical sensor variables, the system comprising:

a computer;

a comparator independent of the computer;

a first sensor that outputs a first sensor variable $e_1$ to the computer; and a second sensor that outputs a second sensor variable $e_2$ directly to the comparator such that the second sensor variable $e_2$ bypasses the computer;

wherein the computer calculates an output variable A based on the first sensor variable $e_1$ and a first function f1 according to the equation $A=f1(e_1)$;

wherein the computer calculates a reference variable v based on the output variable A and a second function f2 according to the equation $v=f2(A)$ and the computer outputs the reference variable v to the comparator;

wherein the first and second sensor variables $e_1$, $e_2$ are in a relationship involving a third function g according to the equation $e_2=g(e_1)$, wherein the third function g is not the identity function;

wherein the second function f2 is given by a concatenation of the third function g with the inverted first function $\overline{f1}$ according to the equation $f2 = g \circ \overline{f1}$;

wherein the comparator compares the reference variable v with the second sensor variable $e_2$ to determine whether the equation $v=e_2$ is correct, wherein the comparator determining the equation $v=e_2$ to be correct is indicative of the computer properly calculating the reference variable v based on the output variable A and the second function f2 according to the equation $v=f2(A)$.

2. The system of claim 1 wherein:

the second sensor variable $e_2$ differs from the first sensor variable $e_1$ by an additive constant K.

3. The system of claim 1 wherein:

the second sensor variable $e_2$ differs from the first sensor variable $e_1$ by a constant factor k.

4. The system of claim 1 wherein:

the first sensor and the second sensor detect different physical variables.

5. A system for evaluating safety critical sensor variables, the system comprising:

a computer;

a comparator independent of the computer;

a first sensor that outputs a first sensor variable $e_1$ to the computer; and a second sensor that outputs a second sensor variable $e_2$ directly to the comparator such that the second sensor variable $e_2$ bypasses the computer;

wherein the computer calculates an output variable A based on the first sensor variable $e_1$ and a first function f1 according to the equation $A=f1(e_1)$;

wherein the computer calculates a first reference variable $v_1$ based on the output variable A and a second function f2 according to the equation $v_1=f2(A)$ and the computer outputs the first reference variable $v_1$ to the comparator;

wherein the first and second sensor variables $e_1$, $e_2$ are in a relationship involving a third function g and a fourth function h concatenated with one another according to the equation $e_2=(h \circ g)(e_1)$, wherein neither the third function g nor the fourth function h is the identity function;

wherein the second function f2 is given by a concatenation of the third function g with the inverted first function $\overline{f1}$ according to the equation $f2 = g \circ \overline{f1}$;

wherein the comparator calculates a second reference variable $v_2$ based on the first reference variable $v_1$ and the fourth function h according to the equation $v_2=h(v_1)$;

wherein the comparator compares the second reference variable $v_2$ with the second sensor variable $e_2$ to determine whether the equation $v_2=e_2$ is correct, wherein the comparator determining the equation $v_2=e_2$ to be correct is indicative of the computer properly calculating the first reference variable $v_1$ based on the output variable A and the second function f2 according to the equation $v_1=f2(A)$.

6. The system of claim 5 wherein:

the second sensor variable e, differs from the first sensor variable $e_1$ by an additive constant K.

7. The system of claim 5 wherein:

the second sensor variable e, differs from the first sensor variable $e_1$ by a constant factor k.

8. The system of claim 5 wherein:

the first sensor and the second sensor detect different physical variables.

* * * * *